United States Patent [19]

Nakano

[11] Patent Number: 4,745,314
[45] Date of Patent: May 17, 1988

[54] LIQUID-COOLED MOTOR
[75] Inventor: Jiro Nakano, Hino, Japan
[73] Assignee: Fanuc Ltd., Yamanashi, Japan
[21] Appl. No.: 887,163
[22] PCT Filed: Nov. 13, 1985
[86] PCT No.: PCT/JP85/00634
§ 371 Date: Jul. 8, 1986
§ 102(e) Date: Jul. 8, 1986
[87] PCT Pub. No.: WO86/03069
PCT Pub. Date: May 22, 1986

[30] Foreign Application Priority Data
Nov. 14, 1984 [JP] Japan .................. 59-238589

[51] Int. Cl.$^4$ .............................................. H02K 9/08
[52] U.S. Cl. .......................................... 310/57; 310/54;
310/59; 310/60 A; 310/217; 310/254
[58] Field of Search ................... 310/52, 54, 55, 57,
310/59, 60 A, 60 R, 64, 65, 43, 45, 216, 254,
258, 259, 58, 88, 89, 91, 42, 217; 165/104.33

[56] References Cited
U.S. PATENT DOCUMENTS

| | | | |
|---|---|---|---|
| 1,631,737 | 6/1927 | Knight | 310/64 |
| 2,390,130 | 12/1945 | Sigmund | 310/54 |
| 2,493,414 | 1/1950 | Morrison | 310/42 UX |
| 2,697,179 | 12/1954 | Wendel | 310/91 |
| 3,693,035 | 9/1972 | Ostwald | 310/259 |
| 4,319,150 | 3/1982 | Roddy | 310/258 |
| 4,534,686 | 8/1985 | Nakamura | 310/59 |

FOREIGN PATENT DOCUMENTS

| | | | |
|---|---|---|---|
| 0128113 | 10/1975 | Japan | 310/52 |
| 0053557 | 5/1981 | Japan | 310/59 |
| 0072959 | 4/1984 | Japan | 310/59 |
| 0288851 | 6/1953 | Switzerland | 310/216 |

OTHER PUBLICATIONS

Materials of Engineering; C.K. Keyser; Prentice Hall, Inc.; Englewood Cliffs, N.J.; Sept. 1956; page 426.

Primary Examiner—R. Skudy
Attorney, Agent, or Firm—Armstrong, Nikaido, Marmelstein & Kubovcik

[57] ABSTRACT

A liquid-cooled motor having cooling liquid passages (26a, 26b, 26c) formed in the laminated core (16) of the stator (14). End plates (20, 22) are applied to the axially opposite end faces of the laminated core (16) of the stator (14), and a compressive force is applied through the end plates to the laminated core (16) by clamping the laminated core (16) with bolts (30) inserted through the end plates (20, 22) and the cooling liquid passages (26a, 26b) of the laminated core (16).

4 Claims, 1 Drawing Sheet

LIQUID-COOLED MOTOR

DESCRIPTION

1. Technical Field

The present invention relates to a liquid-cooled AC motor having a laminated stator core provided with cooling liquid circulating passages for directly cooling the stator by circulating a cooling liquid through the cooling liquid circulating passages and, more particularly, to improvements in the leakproof construction of the cooling liquid circulating passages.

2. Background Art

Air-cooled AC motors (for example, U.S. Pat. No. 4,534,686), in which cooling air passages are formed in the laminated core for directly cooling the stator as a construction for cooling the stator by removing the heat of iron loss and copper loss from the laminated core, have been widely used. An AC motor of a cooling system, in which cooling water is introduced from the outside into cooling liquid circulating passages formed in the laminated core to cool the laminated core, and then the cooling liquid holding the heat of the laminated core is discharged outside the cooling liquid circulating passages and recovered to improve cooling efficiency by cooling the laminated core with a liquid having a large heat capacity, has been proposed.

The cooling construction of this liquid-cooled motor has cooling liquid passages of a leakproof construction formed by welding a laminated core at a plurality of positions on the circumference thereof under compression by an external pressure. Further, a resin is impregnated in the laminated core. However, the leakproof construction of the cooling liquid passages needs further improvement to maintain the leakproof performance over an extended period of time corresponding to the nominal life of the liquid-cooled motor.

DISCLOSURE OF THE INVENTION

Accordingly, it is an object of the present invention to improve the leakproof performance of the cooling liquid passages of the leakproof construction of such a liquid-cooled motor through resin impregnation by uniformly compressing the laminated core over the entire area from the outer circumference to the inner circumference thereof.

In view of the foregoing object of the invention, the present invention provides a liquid-cooled motor comprising a laminated stator core provided with cooling liquid passages, in which end plates are applied to the opposite axial end surface of the laminated core, and the laminated core is compressed through the end plates by fastening the end plates with bolts inserted through the end plates and the cooling liquid passages of the laminated core. Thus, the present invention is intended to enhance the leakproof performance of the cooling liquid passages by uniformly compressing the laminated core over the entire area from the outer circumference to the inner circumference thereof to a higher degree and impregnating the highly compressed laminated core with a resin.

BEST MODE FOR CARRYING OUT THE INVENTION

Figure 2:
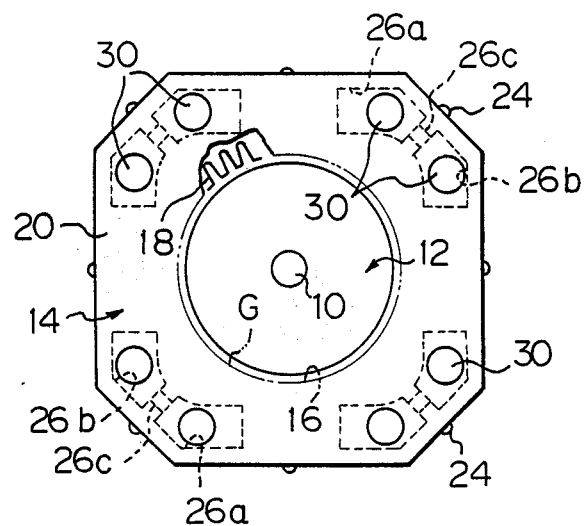
FIG. 2 is a side elevation of the liquid-cooled motor of FIG. 1, as viewed from one end thereof.

Referring first to FIG. 2, a liquid-cooled motor embodying the present invention comprises a rotor 12 rotatably supported by a rotor shaft 10 in the central portion thereof, and a stator 14 surrounding the rotor 12 with a gap G therebetween. The stator 14 has a core 16 formed by laminating thin plates along the direction of the center axis of the rotor shaft 10. As is generally known, stator coils, not shown, are fitted in slots 18 formed in the laminated core 16. End plates are applied to the axially opposite end faces of the laminated core 16, respectively. (In FIG. 2, only one end plate 20 among the two end plates is seen. The other end plate 22 is provided on the other side.) Weld zones 24 extend from the end plate 20 to the other end plate 22 to unite the end plates 20 and 22 and the laminated core 16. The weld zone 24 are formed at a plurality of positions in the circumference of the motor. A plurality of pairs of cooling liquid passages 26a and 26b for circulating a cooling liquid therethrough are distributed symmetrically along the circumference of the motor. Naturally, the cooling liquid passages 26a and 26b are axial passages formed when the component thin plates of the laminated core 16 are laminated by the successive and contiguous arrangement of holes formed by piercing the individual thin plates in blanking the same. When a cooling liquid is introduced into the passages 26a from the outside during the operation of the motor, the cooling liquid flows through the passages 26a and, at the end of the core 16, flows through connecting passages 26c into the passages 26b. The cooling liquid flows further through the passages 26b. Thus, the core 16 is cooled directly by the cooling liquid having a greater heat capacity than air to remove the heat of iron loss and copper loss generated in the stator 14.

Figure 1:
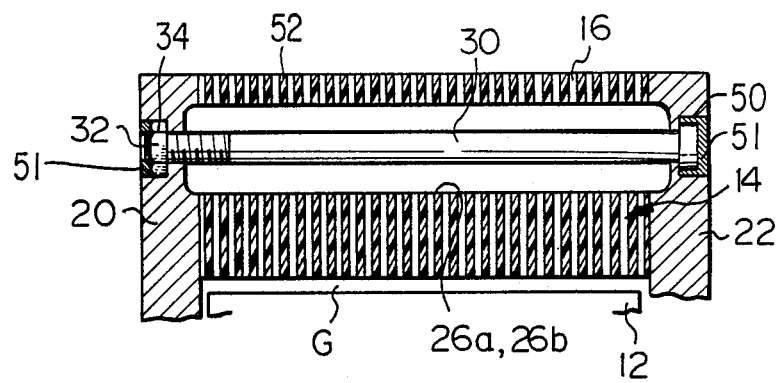
FIG. 1 is a fragmentary sectional view of a liquid-cooled motor, in an embodiment, according to the present invention, showing the essential construction of the liquid-cooled motor relating to liquid-cooling function.

Now, referring to FIG. 1, according to the present invention, bolts 30 are inserted through the end plates 20 and 22 and the cooling liquid passages 26a and 26b. The heads 34 of bolts 30 are seated on the bottom surface of recesses 50 formed in one of the end plates (FIG. 1). Thus, the bolts are distributed symmetrically along the circumference of the motor inside the cooling liquid passages (see FIG. 2). An appropriate compressive force is applied through the end plates 20 and 22 to the laminated core 16 by screwing nuts 32 on the bolts 30, respectively. The compressive force is applied to the laminated core 16 in assembling the motor prior to forming the weld zones 24 and appropriately impregnating the laminated core 16 with a resin 52 for infusing the resin between the adjacent thin plates of the laminated core 16 and for coating the inner surfaces of the cooling liquid passages 26a, 26b and 26c. Thus, the axial compressive force is applied uniformly to the inner peripheral portion of the laminated core 16 facing the rotor 12 with the gap G therebetween, as well as the outer peripheral portion of the laminated core 16 where the weld zones 24 (FIG. 2) are formed, which improves the contact between the adjacent thin plates of the laminated core 16 remarkably. Accordingly, the appropriate impregnation of the thus compressed laminated core with the resin after uniting the end plates 20 and 22 and the laminated core 16 by forming the weld zones 24 makes the resin infuse between the thin plates in sufficiently close contact with each other in the vicinity of the cooling liquid passages 26a, 26b and 26c, and thereby the leakproof performance of the laminated core 16 is greatly improved. Bolt holes formed in the end plates 20 and 22 for receiving the bolts 30 are filled with a hardening resin 51 to seal the cooling liquid passages 26a and 26b.

As is apparent from the foregoing description, according to the present invention, bolts are inserted through the end plates and the cooling liquid passages formed in the laminated core of the stator of a liquid-cooled motor, and a compressive force is applied through the end plates to the laminated core by means of the bolts. Thus, the bolts are distributed symmetrically along the circumference of the motor with the cooling liquid passages. Accordingly, the closeness of adherence between the adjacent thin plates of the laminated core is improved remarkably. Furthermore, since the laminated core consisting of thin plates highly closely adhering to each other is impregnated with a resin, the leakproof performance of the cooling liquid passages is improved greatly.

Still further, it is apparent that the compressive force can be easily standardized, because it is easy to fix the clamping force of the bolts.

I claim:

1. A liquid-cooled motor comprising:
    a rotor having a rotor shaft in a central portion thereof;
    a stator comprising a laminated core impregnated with a resin, said laminated core being provided with a plurality of pairs of cooling liquid passages each pair having two axially extending cooling liquid passages bored from one end face to another end face of said laminated core;
    end plates applied to axially opposite end faces of the laminated core of said stator, respectively, said two axially extending cooling liquid passages of each pair being connected together at both end faces of said laminated core by a connecting passage;
    a plurality of clamping means for inserting through the end plates and the cooling liquid passages of the laminated core, said clamping means for applying a compressive force to the laminated core by pressing the end plates against said axially opposite end faces of said laminated core, respectively, wherein said resin of said laminated core coats the cooling liquid passages of the laminated core with the resin to construct a leakproof construction after the laminated core is clamped with said clamping means.

2. A liquid-cooled motor according to claim 1, wherein said plurality of clamping means includes nuts and bolts having heads, the heads of the bolts of said clamping means are seated on bottom surfaces of recesses formed in one end of the end plates, and the nuts of said clamping means, cooperating with the bolts, are seated on the bottom surfaces of recesses formed in the other end plate.

3. A liquid-cooled motor according to claim 2, wherein the recesses formed in said end plates for receiving the heads of the bolts and the nuts are sealed with a resin.

4. A liquid-cooled motor according to claim 1, wherein said plurality of clamping means are disposed substantially symmetrically with respect to the center of said stator.

* * * * *